United States Patent
De Boeck et al.

[15] 3,669,833
[45] June 13, 1972

[54] NUCLEAR FUEL

[72] Inventors: Paul De Boeck, Mol; Bernard Marteel, Middelkerke; Jozef Schrijvers, Dessel, all of Belgium

[73] Assignee: Belgonucleaire, S.A., Bruxelles, Belgium

[22] Filed: Sept. 30, 1968

[21] Appl. No.: 763,761

[30] Foreign Application Priority Data

Sept. 29, 1967 Belgium................................49,002

[52] U.S. Cl..........................176/68, 176/73, 176/79
[51] Int. Cl...........................................G21c 3/18
[58] Field of Search..........176/74, 79, 80, 67, 87, 75, 176/68, 73

[56] References Cited

UNITED STATES PATENTS

| | | | |
|---|---|---|---|
| 3,160,951 | 12/1964 | Markert et al. | 176/67 X |
| 3,244,599 | 4/1966 | Hildebrand | 176/73 X |
| 3,310,474 | 3/1967 | Saunders | 176/68 X |
| 3,378,458 | 4/1968 | Ross et al. | 176/68 X |
| 3,466,226 | 9/1969 | Lass | 176/68 |
| 2,863,816 | 12/1958 | Stacy | 176/79 X |
| 2,927,071 | 3/1960 | Huey | 176/79 |
| 3,384,551 | 5/1968 | Kornbichler | 176/67 |
| 3,392,438 | 7/1968 | Coulter et al. | 176/79 X |
| 3,399,112 | 8/1968 | Dodd | 176/79 |
| 3,406,094 | 10/1968 | Beisswenger et al. | 176/79 |
| 3,434,323 | 3/1969 | Ormerod | 176/67 X |

Primary Examiner—Carl D. Quarforth
Assistant Examiner—Gary G. Solyst
Attorney—William D. Hall, Elliott I. Pollock, Fred C. Philpitt, George Vande Sande, Charles F. Steininger and Robert R. Priddy

[57] ABSTRACT

A fuel rod which contains a stack of fuel pellets held in position in a lower cladding tube by an inner tube, secured inside the lower cladding tube above the fuel pellets, the inner tube engaging both the upper fuel pellet in the stack and an upper tube.

4 Claims, 3 Drawing Figures

NUCLEAR FUEL

BACKGROUND OF THE INVENTION

This invention relates to nuclear reactor fuel rods, and more specifically to means for holding fuel in position within said rods. In such rods, individual pellets of fuel are usually held within a cladding tube in such a way that they cannot move relative to one another during transportation of the rod or during operation in a nuclear reactor. The systems generally used to hold the fuel in position within the cladding are: (a) a spring located between the fuel and the closure plug, which only partially prevents axial motion of the fuel relative to the cladding during transportation or irradiation: (b) a force fitted metal washer, which produces clad strains and corresponding focal stresses which impair good fuel performance; (c) an internal tube fixed to the closure plug, which reduces the space available for fission gas storage; and (d) a combination of the foregoing. Some of these systems require materials which result in high manufacturing costs.

SUMMARY OF THE INVENTION

The present invention has as its object the provision of a simple system for anchoring any fuel within any clad of any fuel rod for any use. According to the invention, fuel rods are provided in which a fuel pellet stack is held in a first tube, which may be an outer, e.g., cladding, tube. The pellet may be held in place from one end, e.g., from beneath, in any suitable fashion, such as for instance by supportive engagement with a bottom closure plug at the lower end of the first tube, or with an insulating pellet, or with a subjacent fuel pellet stack in the stack of pellets, or by a combination of all three of the foregoing. The pellet is held in place from its other end, e.g., from above, by engagement with a second or inner tube which is of smaller outside dimensions (transverse) than the inside dimensions (transverse) of the first tube. A gas storage region is provided above the pellet stack. The second tube has a first end which extends within the first tube and engages the upper fuel pellet in the stack either by direct engagement, e.g., through direct contact, or by indirect engagement, e.g., by contacting a follower or spring which does contact the pellet in such manner as to at least assist in holding the pellet in place. The outside diameter of the second tube (where it contacts the first) is substantially the same as inside diameter of the first tube (where it contacts the second), such difference in diameter as is necessary to provide a normal clearance for easily sliding the second tube into the first for assembly purposes being excepted. The second tube is shorter than the first, but its second end projects out of an open end of the first tube and into the open end of a third tube longer than the second but having an inside diameter "substantially the same" (as previously defined) as the outside diameter of the second tube. The three tubes may be secured together in a single assembly and by a single fastening means, such as by a welded bead, which extends around the circumferential outer surface of the second tube, uniting it to adjoining, substantially abutting ends of the first and third tubes. Preferably such weld extends continuously, joining all three tubes all around the entire periphery of the second tube. In such an assembly, the second tube engages and assists in holding one or more fuel pellets in place within the first tube, which constitutes a cladding tube and the lower portion of a fuel rod, while the third tube constitutes the upper portion of the fuel rod.

In addition to the apparatus described above, the present invention provides a novel method of assembling a fuel rod comprising a cladding tube which contains a fuel pellet. In accordance with the invention, the pellet is held in place in the cladding tube by engaging it directly or indirectly with a first end of an inner tube having an external diameter substantially equal to the cladding tube inner diameter and the inner tube is secured to the cladding tube with said first end in engagement with the fuel pellet. The inner tube is secured in the cladding tub with a second end of the second tube projecting out of one end of the cladding tube. One end of an upper tube of inner diameter substantially equal to the inner tube outer diameter is slipped over the outwardly projecting second end of the inner tube with said one end of the upper tube in substantially (nearly) abutting relationship with said one end of said cladding tube and the abutting ends are secured to one another and to the peripheral outer surface of the inner tube intermediate its ends by common fastening means, e.g., one or more welds in the small space between the nearly abutting ends of the cladding and upper tubes. Brazing, soldering or other fastening means may also be used. The fastening is preferably gas-tight so as to provide a lead-proof joint.

BRIEF DESCRIPTION OF THE DRAWINGS

A preferred embodiment to be described hereinafter is depicted in the accompanying drawings in which the same reference numerals are used for the same parts in all figures.

DESCRIPTION OF PREFERRED EMBODIMENTS

Figures 1, 2, 3, 4:
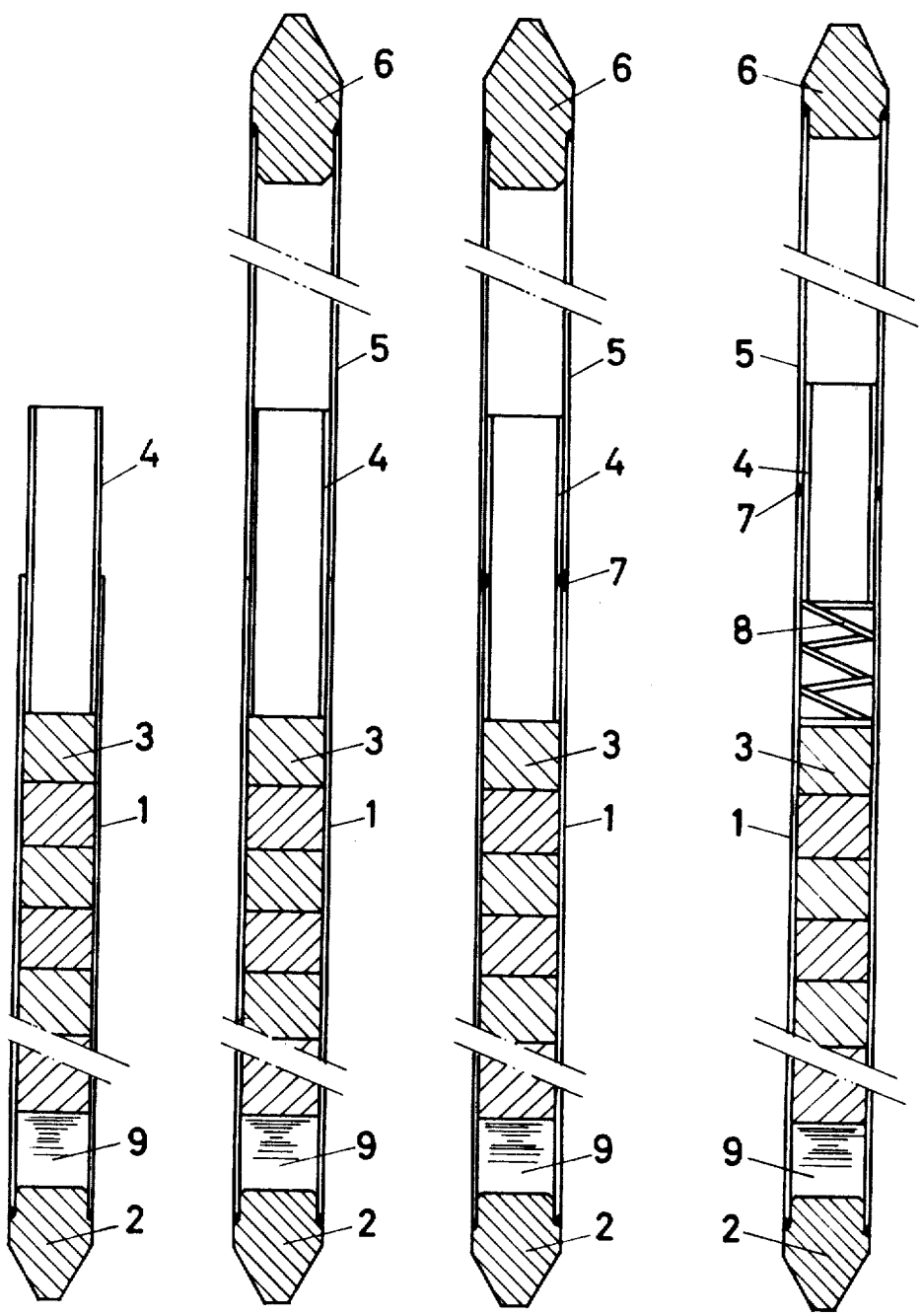
FIGS. 1 and 2 are longitudinal sections through partially completed fuel rods in accordance with the invention in differing stages of completion.
FIG. 3 is a longitudinal section through a completed first embodiment of a fuel rod in accordance with the invention showing direct engagement between the second tube and a fuel pellet.
FIG. 4 is a longitudinal section through a completed second embodiment of a fuel rod in accordance with the invention showing indirect engagement between the second tube and a fuel pellet.

FIG. 1 shows a first or cladding tube 1 of circular transverse cross-section, closed at the bottom by a bottom closure plug 2, and containing a stack of fuel pellets 3 which fill the transverse cross-section of the tube 1. Plug 2 is isolated from fuel pellets 3 by an insulating pellet 9 which supportively engages the bottom pellet in the stack. Inner tube 4 is inserted above upper pellet 3. The outside diameter of tube 4 is substantially the same as (e.g., only about 20 $\mu$ smaller than) the inner diameter of the cladding tube. As shown in FIG. 2, upper tube 5, the inner diameter of which is substantially the same as that of cladding tube 1, is slipped over the projecting end of inner tube 4. Tube 5 is fitted with an upper closure plug 6. Cladding tube 1, inner tube 4 and upper tube 5, which are individually of uniform diameter throughout their length, are then fixed to one another by welding. This weld is represented by reference number 7 in FIG. 3.

FIG. 4 shows a fuel rod in which the fuel is kept in place in accordance with this invention and where a spring 8, located between inner tube 4 and upper fuel pellet 3, allows some degree of fuel freedom.

One of the advantages of this procedure, is that fixing of the position of the fuel is achieved without reducing the volume available for fission gas storage. The present method and apparatus do not give rise to local stresses impairing good fuel performance and require no machining of structural materials.

As already indicated, various modifications of the embodiments of the invention just described may be made without departing from the spirit of the invention, and it would be impossible to describe all of them herein. For instance, the joining of the parts together may be achieved by soldering or any other known means. In some cases, inner tube 4 may have a blind upper end or be fitted with a closure plug. In like fashion, the term engagement is also intended to embrace the securing of the second tube or the second tube and a follower, in very close proximity to the fuel pellet, so that although there will not always be direct contact between the second tube and the pellet, a slight shifting of the position of pellet towards the second tube or the follower will result in such contact.

What is claimed is:

1. A fuel rod comprising: first, second, and third tubes having a common welding or brazed connection which connects all of them together; said first tube having a closed end and an open end; a plurality of stacked fuel pellets in said first tube, said stacked fuel pellets including a top fuel pellet and a bottom fuel pellet which is in supportive engagement with said closed end; a fission gas storage region in said fuel rod above said pellets; said second tube having first and second longitudinal portions and corresponding first and second ends; said first longitudinal portion of said second tube having an outside diameter substantially equal to the inside diameter of said open end of said first tube and being fixedly secured in said open end by said welded or brazed connection with said first end of said second tube in engagement with said top fuel pellet; said second longitudinal portion of said second tube having an outside diameter substantially equal to the inside diameter of one end of said third tube; said second end and longitudinal portion of said second tube also being fixedly secured in said one end of said third tube by said welded or brazed connection.

2. A fuel rod in accordance with claim 1 wherein said bottom fuel pellet is in supportive engagement with a closure plug located at the closed end of said first tube.

3. A fuel rod in accordance with claim 1 wherein said top fuel pellet engages said first end of said second tube indirectly through a follower spring.

4. A fuel rod in accordance with claim 1 wherein said first, second and third tubes are each of uniform cross-section throughout their length, and said second tube being of shorter length than said first and third tubes.

* * * * *